United States Patent [19]

Fukushima

[11] Patent Number: 5,096,863
[45] Date of Patent: Mar. 17, 1992

[54] DIFFUSION-BONDED ASSEMBLY OF AlN CERAMIC BODIES AND HEAT DISSIPATION MEMBER CONSTITUTED THEREBY

[75] Inventor: Hideko Fukushima, Kumagaya, Japan

[73] Assignee: 501 Hitachi Metals, Ltd., Tokyo, Japan

[21] Appl. No.: 709,795

[22] Filed: Jun. 5, 1991

Related U.S. Application Data

[63] Continuation of Ser. No. 519,757, May 7, 1990, abandoned.

[30] Foreign Application Priority Data

Nov. 4, 1988 [JP] Japan .................................. 63-278774

[51] Int. Cl.$^5$ ............................................. C04B 35/58
[52] U.S. Cl. ...................................... 501/98; 501/96; 156/89; 165/80.3
[58] Field of Search .................. 501/96, 98; 437/902; 165/80.3; 156/89

[56] References Cited

U.S. PATENT DOCUMENTS

| | | |
|---|---|---|
| 4,406,722 | 9/1983 | Chow et al. |
| 4,591,537 | 5/1986 | Aldinger et al. .............. 501/98 X |
| 4,755,491 | 7/1988 | Miwa .............................. 501/98 X |
| 4,766,097 | 8/1988 | Shinozaki et al. .............. 501/98 |
| 4,810,679 | 3/1989 | Dole et al. ...................... 501/98 |
| 4,847,221 | 7/1989 | Horiguchi et al. .............. 501/98 |
| 4,897,372 | 1/1990 | Huseby et al. .................. 501/98 X |

FOREIGN PATENT DOCUMENTS

| | | |
|---|---|---|
| 0147101 | 7/1985 | European Pat. Off. ........... 501/98 |
| 57-205817 | 12/1982 | Japan . |
| 61-68375 | 6/1986 | Japan . |

*Primary Examiner*—Karl Group
*Attorney, Agent, or Firm*—Finnegan, Henderson, Farabow, Garrett & Dunner

[57] ABSTRACT

A diffusion-bonded assembly of AlN ceramic bodies, at least one of the AlN ceramic bodies having a boundary phase content of 1000 ppm or more. A heat dissipation member constituted by diffusion-bonded AlN ceramic bodies, at least one of the AlN ceramic bodies having a boundary phase content of 1000 ppm or more.

9 Claims, 4 Drawing Sheets

$h_1 = 7$   $w_1 = 49$
$h_2 = 2$   $w_2 = 1$
$h_3 = 12$  $l_1 = 50$
(mm)

DIFFUSION-BONDED ASSEMBLY OF AlN CERAMIC BODIES AND HEAT DISSIPATION MEMBER CONSTITUTED THEREBY

This application is a continuation of application Ser. No. 07/519,757, filed May 7, 1990 now abandoned.

BACKGROUND OF THE INVENTION

The present invention relates to a diffusion-bonded assembly of AlN ceramic bodies having a high bonding strength and a heat dissipation member constituted by such diffusion-bonded assembly of AlN ceramic bodies.

Diffusion bonding of ceramic members is conventionally known. The diffusion bonding is generally conducted by bringing flat surfaces of ceramic members into contact with each other and heating them with or without pressing to cause the diffusion of atoms into both members. For instance, in the case of diffusion bonding of $Si_3N_4$ and $Al_2O_3$, they are kept at about 1700° C. while being pressed to each other, to cause solid-phase diffusion bonding.

Japanese Patent Laid-Open No. 61-68375 discloses a method of bonding $Si_3N_4$ and $Al_2O_3$ with an intermediate layer of sialon.

Japanese Patent Laid-Open No. 57-205817 discloses the diffusion bonding of single crystalline ferrite and polycrystalline ferrite, which is conducted at 1050°–1400° C. in an atmosphere containing an oxidizing gas to omit compression and mirror-finishing.

Japanese Patent Laid-Open No. 58-190879 discloses the bonding of different ceramics in which they are heated to a temperature at which their expansion curves cross each other to conduct their diffusion bonding.

As described above, various methods are adopted to conduct the diffusion bonding of ceramics, but it has not been clarified what properties of ceramics are needed to provide good diffusion bonding, and what conditions are needed for the diffusion bonding of even the same kinds of ceramics.

With respect to an AlN ceramic body, it has as high a thermal conductivity as 140 W/mK or more, and is used as a heat dissipation member for electronic parts such as semiconductor devices as shown in FIG. 7. When it is formed with fins 4 to have a large heat dissipation area, fins tend to be broken when they are integrally formed, failing to provide a sufficient heat dissipation area.

OBJECT AND SUMMARY OF THE INVENTION

In view of the above problems, an object of the present invention is to provide a diffusion-bonded assembly AlN ceramic bodies with high bonding strength.

Another object of the present invention is to provide a heat dissipation member constituted by such diffusion-bonded assembly of AlN ceramic bodies.

In the diffusion-bonded assembly of AlN ceramic bodies according to one embodiment of the present invention, at least one of the AlN ceramic bodies has a boundary phase content of 1000 ppm or more.

In the diffusion-bonded assembly of AlN ceramic bodies according to another embodiment of the present invention, the AlN ceramic bodies are diffusion-bonded via a soldering material having a boundary phase content of 1000 ppm or more.

The heat dissipation member according to a further embodiment of the present invention is constituted by diffusion-bonded AlN ceramic bodies, at least one of the AlN ceramic bodies having a boundary phase content of 1000 ppm or more.

The heat dissipation member according to a still further embodiment of the present invention is constituted by AlN ceramic bodies diffusion-bonded via a soldering material made of an AlN ceramic having a boundary phase content of 1000 ppm or more.

The heat dissipation member according to a still further embodiment of the present invention is constituted by an AlN ceramic substrate and AlN ceramic fins diffusion-bonded to each other, either or both of the AlN ceramic substrate and the AlN ceramic fins having a boundary phase content of 1000 ppm or more.

As a result of research on the diffusion bonding of AlN ceramic bodies, the inventors have found that the bonding strength of AlN ceramic bodies has close relation to the boundary phase contents of the AlN ceramic bodies, and that when the boundary phase contents of both AlN ceramic bodies are less than 1000 ppm, sufficient bonding strength cannot be obtained.

When a soldering material is used for the diffusion bonding of the AlN ceramic bodies, the soldering material should be made of an AlN ceramic having a boundary phase content of 1000 ppm or more.

DETAILED DESCRIPTION OF THE INVENTION

Figure 1:
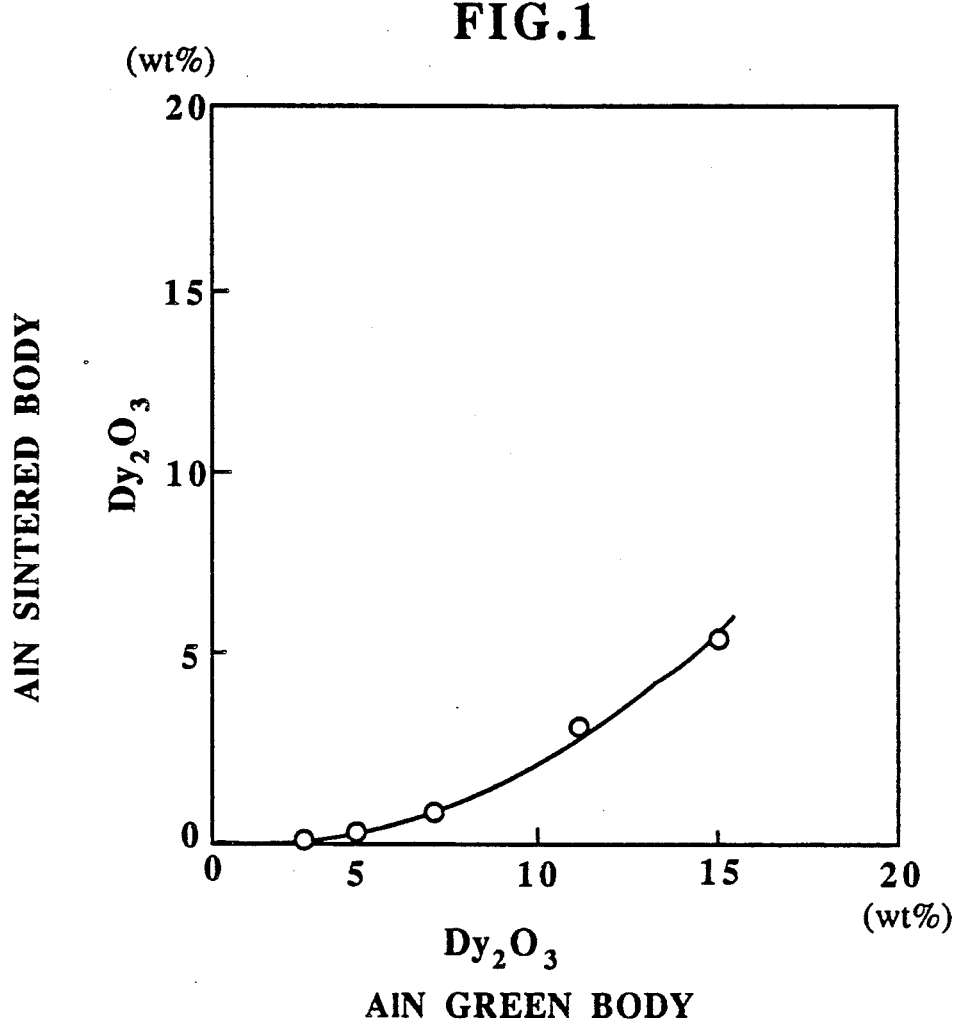
FIG. 1 is a graph showing the relation between the boundary phase content ($Dy_2O_3$ content) of an AlN green body and that of a sintered AlN.

In the first embodiment of the present invention, at least one of AlN ceramic bodies has a boundary phase content of 1000 ppm or more. In the boundary phase, a liquid phase generating from the AlN ceramic body forms a bonding layer between the AlN ceramic bodies. When both AlN ceramic bodies have a boundary phase content of less than 1000 ppm, a sufficient bonding strength cannot be obtained.

In general, higher thermal conductivity can be achieved by lowering the boundary phase content. However, the smaller the boundary phase content, the smaller mechanical strength the AlN ceramic body has. Also, when the boundary phase content is too small, the sintering of AlN ceramics is difficult. In view of these facts, the boundary phase content of an AlN ceramic body desirably has a restricted upper limit. For practical purpose, the upper limit of the boundary phase content is preferably 2000 ppm. The AlN ceramic body having a boundary phase content of 1000-2000 ppm generally has a thermal conductivity of 180-250 W/mK.

When one AlN ceramic body has a boundary phase content of 1000 ppm or more, the other AlN ceramic body may have a boundary phase content of less than 1000 ppm. The possible lower limit of the boundary phase content of the other AlN ceramic body is about 100 ppm. If the boundary phase content is lower than this level, good sintering of AlN ceramics cannot be achieved.

In a second embodiment of the present invention, the soldering material should have a boundary phase content of 1000 ppm or more. For the same reasons as mentioned above, such a boundary phase content is indispensable. When the soldering material is used, the AlN ceramic bodies need not have high boundary phase contents. Namely, even though both AlN ceramic bodies have boundary phase contents of less than 1000 ppm, a sufficient bonding strength can be achieved when the soldering material having a boundary phase content of 1000 ppm or more is used. Incidentally, the upper limit of the boundary phase content in the soldering material is not restricted for bonding strength purposes, but the boundary phase content is desirably as small as possible to achieve high thermal conductivity. Accordingly, the upper limit of the boundary phase content is about 10% for green bodies and about 3%, preferably about 1% for sintered bodies.

In the case of using the soldering material, the same mechanism takes place. Namely, a liquid phase generated from the soldering material serves to bond AlN grains in both AlN ceramic bodies.

The boundary phase is mainly composed of rare earth oxides, such as $Y_2O_3$, $Dy_2O_3$, etc. These rare earth oxides are contained in the AlN ceramic bodies as sintering aids.

The amount of the sintering aid added to AlN ceramics should be determined such that AlN ceramics are well sintered while having high heat conductivity. Accordingly, the amount of the sintering aid is usually 1-15 weight % based on AlN. During sintering, some percentage of the sintering aid is evaporated. Therefore, the content of the sintering aid in the AlN ceramics (boundary phase content) can be controlled by sintering conditions.

FIG. 1 shows the relation between the boundary phase content ($Dy_2O_3$ content) of an AlN green body and that of a sintered AlN. Incidentally, the sintering conditions are 1900° C. for 6 hours in an $N_2$ atmosphere. It is seen from FIG. 1 that the $Dy_2O_3$ content is reduced during the diffusion-bonding operation. In general, when the boundary phase content is reduced to ⅓ to 1/10 by diffusion bonding, high thermal conductivity can be achieved with good bonding strength. Accordingly, the boundary phase content of the sintered AlN is controlled such that the AlN member has a boundary phase content of 1000 ppm or more, particularly 1000-2000 ppm on its surface at the time of diffusion bonding.

The heat dissipation member for cooling electronic parts such as semiconductor devices is constituted by a diffusion-bonded assembly of AlN ceramic bodies. By diffusion bonding, the heat dissipation members having complicated shape such as those provided with a plurality of fins can be easily obtained to have large heat dissipation areas.

Incidentally, the boundary phase content of the diffusion-bonded AlN ceramic body is calculated as follows:

$$X = 100(D-d)/(d_{liq.}-d) \quad (1)$$

wherein
D: Density of bonded AlN ceramic body.
d: Density of AlN (theoretical density of main component).
$d_{liq.}$: Theoretical density of boundary phase (density of elements added to AlN).
X (vol %): Amount of boundary phase.

During heat treatment such as sintering in the process of preparing diffusion-bonded AlN ceramic bodies, sintering aids such as $Y_2O_3$ added into form a boundary phase are evaporated to the atmosphere. As a result, depending upon heat treatment conditions, such as sintering conditions, the boundary phase content initially determined and the boundary phase content of the resulting diffusion-bonded AlN ceramic bodies are extremely different.

In the actual diffusion bonding, the boundary phase content at the time of diffusion bonding has a close relation to bonding strength. Accordingly, the boundary phase content of the AlN ceramic body to be bonded should be within the desired range. The above equation (1) is used to calculate the boundary phase content of the AlN ceramic body at the time of diffusion bonding.

Incidentally, the diffusion bonding can be conducted on AlN ceramic bodies before sintering (green bodies) and on sintered AlN ceramic bodies. For higher dimensional accuracy, it is preferable to conduct the diffusion bonding on the sintered AlN ceramic bodies.

The present invention will be explained in further detail by the following Examples, without intention of restricting the scope of the present invention.

EXAMPLE 1

Figure 3:
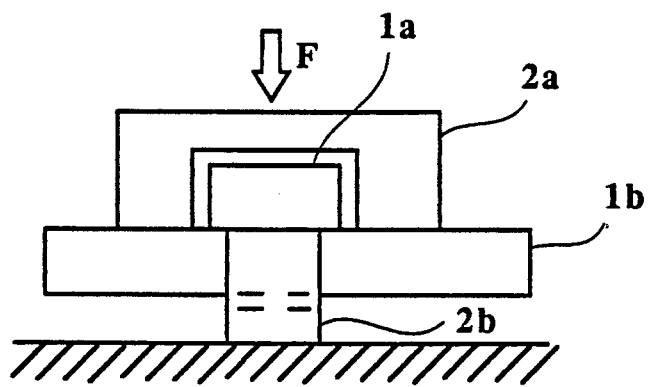
FIG. 3 is a schematic view for showing a method of measuring bonding strength.
Figure 2:
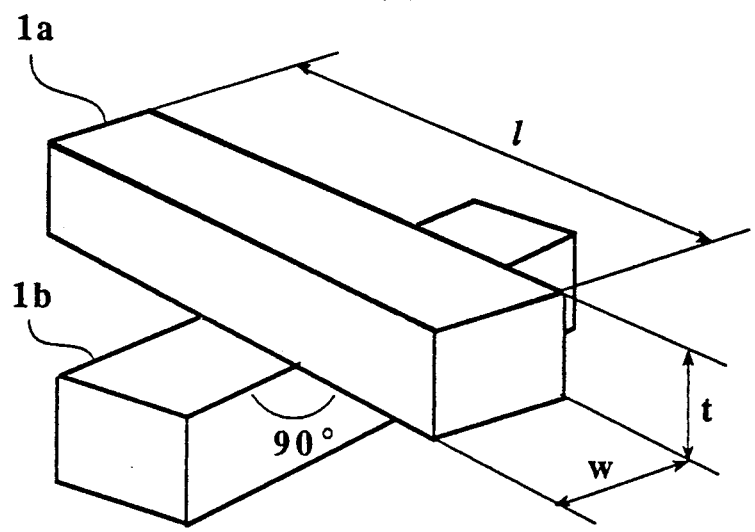
FIG. 2 is a schematic view showing diffusion-bonded AlN samples for evaluating the effects of the present invention.

AlN ceramic bodies 1a, 1b each having a shape shown in FIG. 2 (3 t×4 w×20 l (mm)) were produced. The AlN ceramic body 1a contained 100 ppm of $Y_2O_3$ as a boundary phase and the AlN ceramic body 1b contained 400-3500 ppm of $Y_2O_3$. These samples were rectangularly crossed as shown in FIG. 2, and subjected to a heat diffusion treatment in a heating furnace. The conditions of the heat diffusion treatment were 1800° C. ×1 hour and 1900° C. ×1 hour. No load was added to the samples for diffusion bonding. With jigs 2a, 2b engaging these samples as shown in FIG. 3, a peeling test of the AlN ceramic bodies 1a and 1b was conducted by applying a downward force F to the upper jig 2a.

In this test, the bonding strength was calculated by the following equation:

$$\text{Bonding strength} = F/\text{Contact area of ceramic members 1a, 1b.} \quad (2)$$

Figure 4:
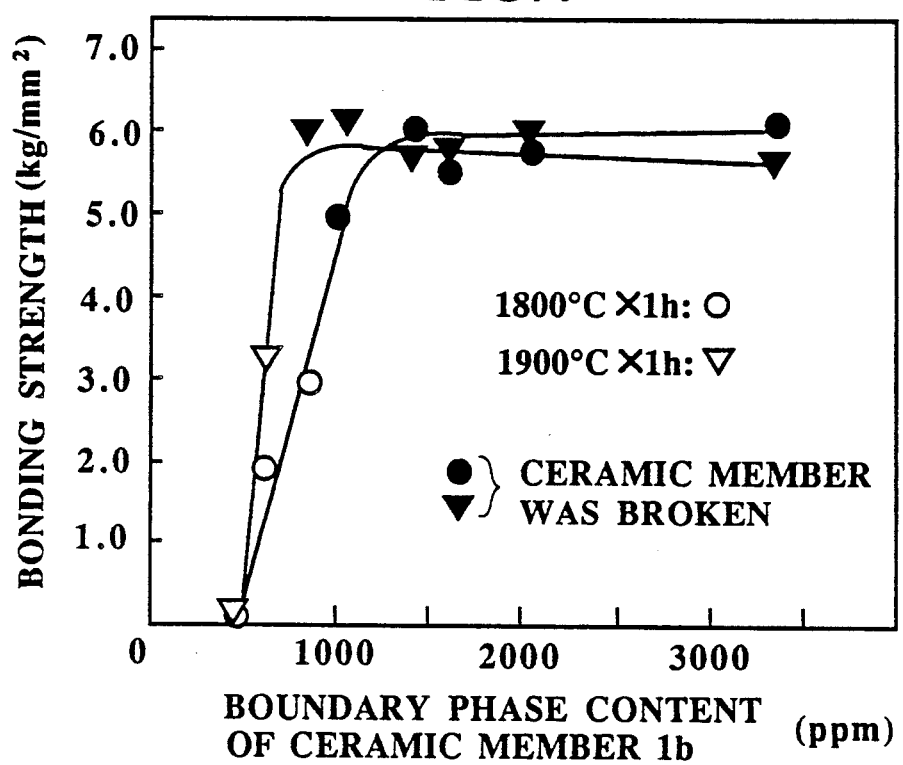
FIG. 4 is a graph showing the relation between the bonding strength and the boundary phase content of AlN ceramic bodies.

The relation between bonding strength obtained by the equation (2) and a boundary phase content is shown in FIG. 4. As is clear from FIG. 4, when the boundary phase content is 1000 ppm or more, the AlN ceramic body was broken, showing that diffusion-bonded AlN ceramic bodies had a sufficient bonding strength.

EXAMPLE 2

Figure 5:
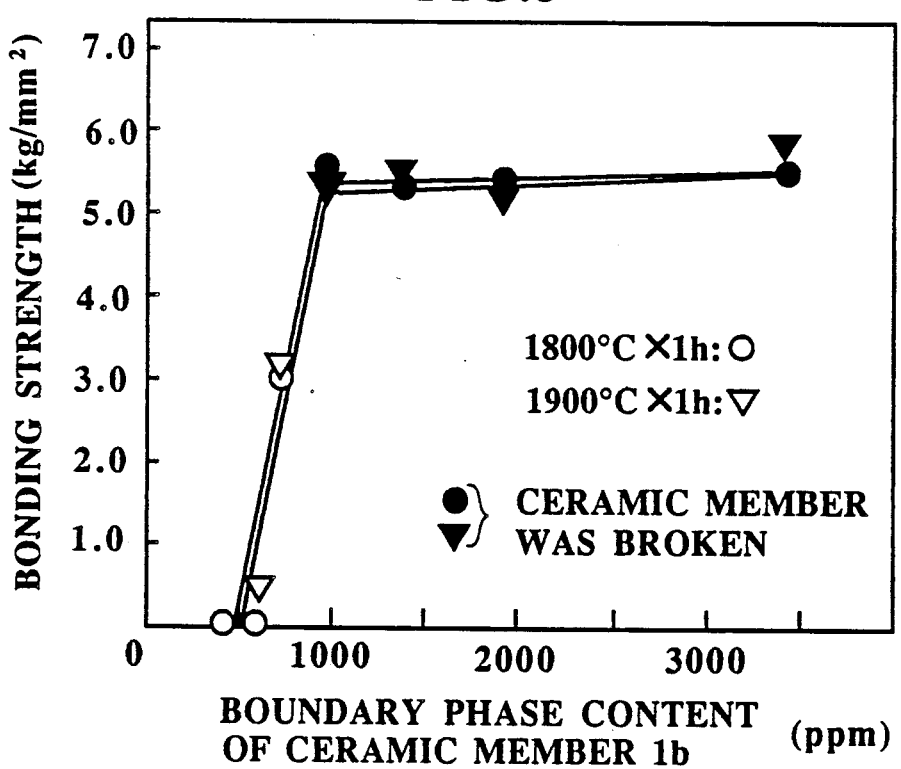
FIG. 5 is a graph showing the relation between the bonding strength and the boundary phase content of AlN ceramic bodies.

An AlN ceramic body sample 1a containing 100 ppm of $Dy_2O_3$ and an AlN ceramic body sample 1b containing 400–3500 ppm of $Dy_2O_3$ were produced in the same manner as in Example 1 to measure the bonding strength. The results are shown in FIG. 5.

In the case of using $Dy_2O_3$ as a boundary phase, there is substantially the same relation between the bonding strength and the boundary phase content as in the case of using $Y_2O_3$. When AlN ceramic bodies had a boundary phase content of 1000 ppm or more, the AlN ceramic body itself was broken, showing that there was sufficient bonding strength.

EXAMPLE 3

An AlN ceramic body sample 1a containing 1200 ppm of $Y_2O_3$ and an AlN ceramic body sample 1b containing 2000 ppm of $Y_2O_3$ were subjected to heat diffusion treatment at 1800° C. for 1 hour in a nitrogen atmosphere.

In this case, the bonding strength was 5.5 kg/mm², and breakage took place in the AlN ceramic body.

EXAMPLE 4

AlN ceramic body samples 1a, 1b (before sintering) in combinations shown in Table 1 were produced in the same manner as in Example 1, and they were coated with a soldering material having a thickness of 0.1 mm by a doctor blade method. After sintering at 1900° C. for 5 hours, a bonding strength measurement was conducted.

Table 2 shows the bonding strength of each sample. As is clear from this table, when the soldering material had a boundary phase content of 1000 ppm or more, breakage took place in the AlN ceramic body, meaning that the assembly had a sufficient bonding strength. In addition, using soldering material having a thickness of 0.1 mm or so, an assembly of AlN ceramic bodies having a boundary phase content of less than 1000 ppm can have sufficiently high bonding strength.

In this Example, the soldering material was applied before sintering of AlN ceramic bodies. However, it is also possible to conduct diffusion bonding of sintered AlN ceramic bodies with a soldering material to provide a sufficient bonding strength, as long as they have a boundary phase content of 1000 ppm or more.

TABLE 2

| No. | Bonding Strength (kg/mm²) | |
|---|---|---|
| | 1800° C. × 1 hour | 1900° C. × 1 hour |
| 1 | >5.8 | >6.3 |
| 2 | >5.4 | >6.0 |
| 3 | >5.6 | >6.2 |
| 4 | >5.9 | >6.0 |
| 5 | 3.3 | >5.1 |
| 6 | 3.3 | 3.8 |
| 7 | 4.0 | 5.0 |
| 8 | 3.4 | 3.8 |

Note:
> means that the ceramic member was broken.

EXAMPLE 5

Figure 6:
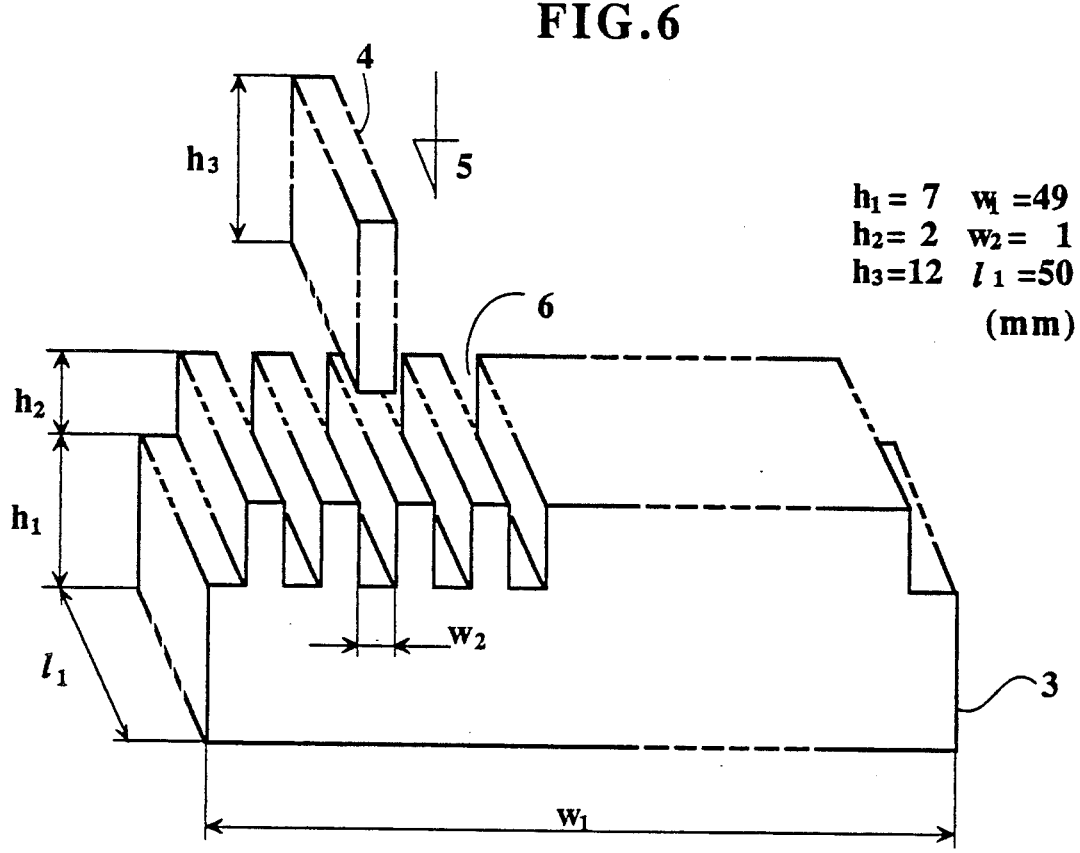
FIG. 6 is schematic perspective view showing the assembling of a heat dissipation member according to one embodiment of the present invention.
Figure 8:
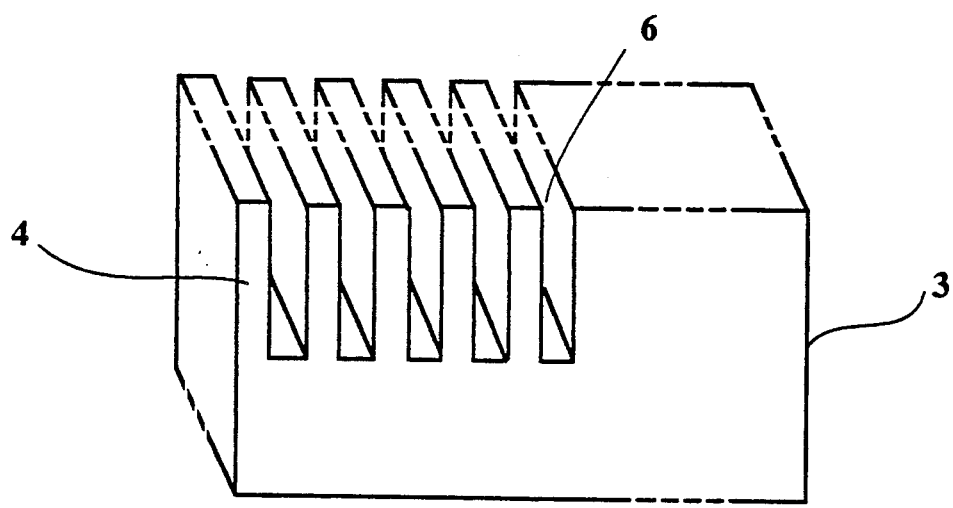
FIG. 8 is a schematic perspective view showing a conventional heat dissipation member.

As shown in FIG. 6, a plurality of AlN ceramic fins 4 were inserted into grooves of an AlN ceramic substrate 3 to provide a heat dissipation member having the same shape as that of the conventional heat dissipation member shown in FIG. 8. In this case, the depth of each groove was 0.01 mm or less, and the number of AlN ceramic fins 4 was 25. Each of the AlN ceramic fins 4 and the AlN ceramic substrate 3 was a sintered AlN ceramic body containing 2000 ppm of $Y_2O_3$. After insertion, the AlN ceramic fins 4 were pressed downward at 0.01 kg/cm² and heated at 1900° C. for 1 hour in a nitrogen atmosphere to conduct a heat diffusion treatment.

The resulting heat dissipation member had no cracks.

Figure 7:
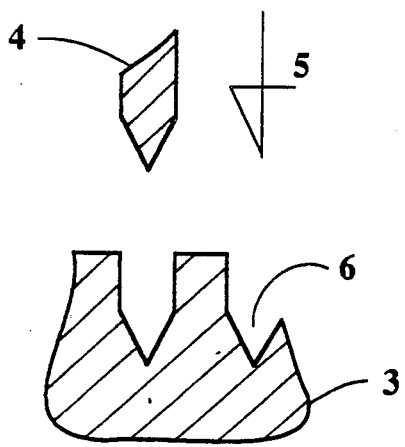
FIG. 7 is a partial cross-sectional view showing the assembling of a heat dissipation member according to another embodiment of the present invention.

Incidentally, the grooves shown in FIG. 6 preferably have a shape as shown in FIG. 7, having a large contact area between the AlN ceramic substrate 3 and the AlN ceramic fins 4.

According to the present invention, diffusion-bonded assembly of AlN ceramic bodies having sufficient bonding strength can be obtained, and the problems inherent in the conventional AlN ceramic body having a complicated shape can be eliminated. Further, this diffusion-bonded assembly of AlN ceramic bodies constitutes a heat dissipation member having a high thermal conductivity.

What is claimed is:

1. An assembly of at least one first AlN ceramic body and at least one second AlN ceramic body directly bonded to each other by heating one face of the first AlN ceramic body to one face of the second AlN ceramic body, said first AlN ceramic body having 1000–2000 ppm of a boundary phase consisting essentially of a sintering aid, wherein said sintering aid comprises rare earth oxides, and said second AlN ceramic

TABLE 1

| No.* | Ceramic Member 1a | | Ceramic Member 1b | | Soldering Material | |
|---|---|---|---|---|---|---|
| | Component | Boundary Phase Content (mol %) | Component | Boundary Phase Content (mol %) | Component | Boundary Phase Content (mol %) |
| 1 | AlN-$Y_2O_3$ | 500 | AlN-$Y_2O_3$ | 500 | AlN-$Y_2O_3$ | 1500 |
| 2 | AlN-$Y_2O_3$ | 500 | AlN-$Y_2O_3$ | 500 | AlN-$Dy_2O_3$ | 1500 |
| 3 | AlN-$Y_2O_3$ | 500 | AlN-$Y_2O_3$ | 500 | AlN-$Y_2O_3$ | 5000 |
| 4 | AlN-$Dy_2O_3$ | 500 | AlN-$Dy_2O_3$ | 500 | AlN-$Dy_2O_3$ | 1500 |
| 5 | AlN-$Y_2O_3$ | 500 | AlN-$Y_2O_3$ | 2000 | AlN-$Y_2O_3$ | 700 |
| 6 | AlN-$Y_2O_3$ | 200 | AlN-$Y_2O_3$ | 500 | AlN-$Y_2O_3$ | 700 |
| 7 | AlN-$Dy_2O_3$ | 500 | AlN-$Dy_2O_3$ | 2000 | AlN-$Y_2O_3$ | 700 |
| 8 | AlN-$Dy_2O_3$ | 500 | AlN-$Y_2O_3$ | 200 | AlN-$Y_2O_3$ | 400 |

Note
*: Nos. 1–4: Present invention.
Nos. 5–8: Comparative Example.

body having less than 1000 ppm of a boundary phase consisting essentially of said sintering aid.

2. The assembly according to claim 1, wherein said assembly is a heat dissipation member wherein the one first AlN ceramic body has at least one groove and the one second AlN ceramic body is a fin that has a shape that will substantially fill the groove of the first AlN ceramic body.

3. The assembly according to claim 1, wherein said assembly is a heat dissipation member wherein the second AlN ceramic body has at least one groove and the first AlN ceramic body is a fin that has a shape that will substantially fill the groove of the second AlN ceramic body.

4. An assembly of at least one first AlN ceramic body and at least one second AlN ceramic body directly bonded to each other by heating one face of the first AlN ceramic body to one face of the second AlN ceramic body, each of said first and second AlN ceramic bodies having 1000-2000 ppm of a boundary phase consisting essentially of a sintering aid, wherein said sintering aid comprises rare earth oxides.

5. The assembly according to claim 4, wherein said assembly is a heat dissipation member wherein the one first AlN ceramic body has at least one groove and the one second AlN ceramic body is a fin that has a shape that will substantially fill the groove of the first AlN ceramic body.

6. An assembly of at least one first AlN ceramic body and at least one second AlN ceramic body bonded to each other by heating a layer of soldering material comprising AlN ceramic between said first and second AlN ceramic bodies, said first and second AlN ceramic bodies having less than 1,000 ppm of a boundary phase consisting essentially of a sintering aid, wherein said sintering aid comprises rare earth oxides, and said soldering material having 1,000 ppm or more of the boundary phase of said sintering aid.

7. The assembly according to claim 6, wherein the boundary phase content of said AlN ceramic of said soldering material is 1000-2000 ppm.

8. The assembly according to claim 6, wherein said assembly is a heat dissipation member wherein the one first AlN ceramic body has at least one groove and the one second AlN ceramic body is a fin that has a shape that will substantially fill the groove of the first AlN ceramic body.

9. The assembly according to claim 8, wherein the boundary phase content of said AlN ceramic of said soldering material is 1000-2000 ppm.

* * * * *